US005630665A

United States Patent [19]
VanBruggen

[11] Patent Number: 5,630,665
[45] Date of Patent: May 20, 1997

[54] FEED MIXER APPARATUS

[75] Inventor: Eldwyn VanBruggen, Valley City, N. Dak.

[73] Assignee: National Feeding Systems, Inc., Valley City, N. Dak.

[21] Appl. No.: 618,494

[22] Filed: Mar. 19, 1996

[51] Int. Cl.⁶ ........................................ B01F 7/00
[52] U.S. Cl. .................. 366/186; 366/193; 366/194; 366/603
[58] Field of Search ........................ 366/184, 186, 366/192, 193, 194, 603, 49

[56] References Cited

U.S. PATENT DOCUMENTS

| | | | |
|---|---|---|---|
| 3,995,836 | 12/1976 | Garter | 366/603 |
| 4,538,916 | 9/1985 | Zimmerman | 366/186 |
| 4,707,140 | 11/1987 | Mahrlang. | |
| 4,756,626 | 7/1988 | Neier. | |
| 4,799,800 | 1/1989 | Schuler. | |
| 5,143,449 | 9/1992 | Faccia | 366/186 |

*Primary Examiner*—Robert W. Jenkins
*Attorney, Agent, or Firm*—David A. Lingbeck

[57] ABSTRACT

A feed mixer apparatus includes a tongue attached to a frame mounted upon a wheeled axle, a forward and rearward mixing chambers separated by a trough, a pair of reels driven by sprockets and gears and drive shafts which are actuated by a power take off on preferably a prime, a plurality of elongate mixing members extending between the side walls of the mixing chambers and deflectably attached to the ends of a plurality of radially-extending arms, an auger being rotatably disposed in the trough and having fins attached thereon for flipping clumps or chunks of feed material back into the chambers, an opening through a side wall in alignment with the trough and through which fine particles of feed material is dispensed to the outside, and a conveyor chute pivotally attached to the side wall in alignment with the opening to facilitate the dispensing of fine particles of feed material to the outside.

15 Claims, 6 Drawing Sheets

5,630,665

FEED MIXER APPARATUS

BACKGROUND OF THE INVENTION

This invention relates to a feed mixer apparatus which can be hitched behind a prime mover and which holds, mixes, and dispenses feed.

Feed mixers are not new in the art. The quest to have bigger, heavier, and healthier livestock has spawned many different types of feed mixers each having its own method of mixing the feed and then dispensing the feed from the mixer.

One known prior art is a FEED MIXER, U.S. Pat. No. 4,707,140, issued on Nov. 17, 1987 and invented by Harry Mohrlang, comprising a tank having two mixing chambers, rotors, mixing paddles connected to the rotors with each paddle being offset from the rotational axis of the respective rotor by about 15 degrees, and a chute through which the mixed feed is dispensed.

Another known prior art is a FLUENT AND NONFLUENT MATERIAL MIXER, U.S. Pat. No. 4,756,626, issued on Jul. 12, 1988 and invented by Benjamin R. Neier, comprising a main chamber, a rotor mounted in the main chamber, at least one wiper for wiping contact with the wall portion of the chamber, and a pair of augers.

Another known prior art is a FEED MIXER, U.S. Pat. No. 4,799,800, issued on Jan. 24, 1989 and invented by Dorland H. Schuler, comprising a mixing chamber, a pair of mixing reels mounted in the chamber, a plurality of mixing paddles, and a first auger and a second auger.

None of the prior art describes a feed mixer which prevents clumps or chunks of feed material from exiting the feed mixer along with the fine particles of feed material, a problem substantially solved by the present invention.

SUMMARY OF THE INVENTION

This invention relates to a feed mixer apparatus which comprises a frame mounted upon a wheeled axle and having a plurality of upright frame members spaced apart from one another, a tongue fixedly attached to the frame for hitching to a prime mover, a forward mixing chamber, a rearward mixing chamber, a trough separating the two mixing chambers, a first reel having a plurality of elongate resiliently deflectable mixing members, a second reel also having a plurality of elongate resiliently deflectable mixing members, an auger having a plurality of fins separated by sections of auger flighting and being disposed in the trough to not only move fine particles of feed material out of the mixing chambers but also to facilitate the moving of feed material from one chamber to the next, a dispensing chute attached to one side of the frame, means for actuating the reels which move the elongate mixing members about the reel shafts either clockwise or counterclockwise and for actuating the auger, and means for actuating the conveyor system.

One objective of the present invention is to provide a feed mixer apparatus which effectively mixes and moves feed from one chamber to another chamber in a tumbling and material separating manner.

Another objective of the present invention is to provide a feed mixer apparatus which mixes the feed material at a relatively slow speed because of the use of sprockets to drive reels which are many times larger than the sprockets.

Further, another objective of the present invention is to provide a feed mixer apparatus which prevents clumps or chunks of feed material from exiting the chamber. Only fine particles of feed material are allowed to exit the chambers.

Yet, another objective of the present invention is to provide a feed mixer apparatus which has a unique auger which dispenses fine particles of feed material to the outside but which flips clumps and chunks of feed material back into the mixing chambers to be broken down into fine particles.

Further objectives and advantages of the present invention will become apparent as the description proceeds and when taken in conjunction with the accompanying drawings wherein:

DETAILED DESCRIPTION OF THE INVENTION

Figure 1:
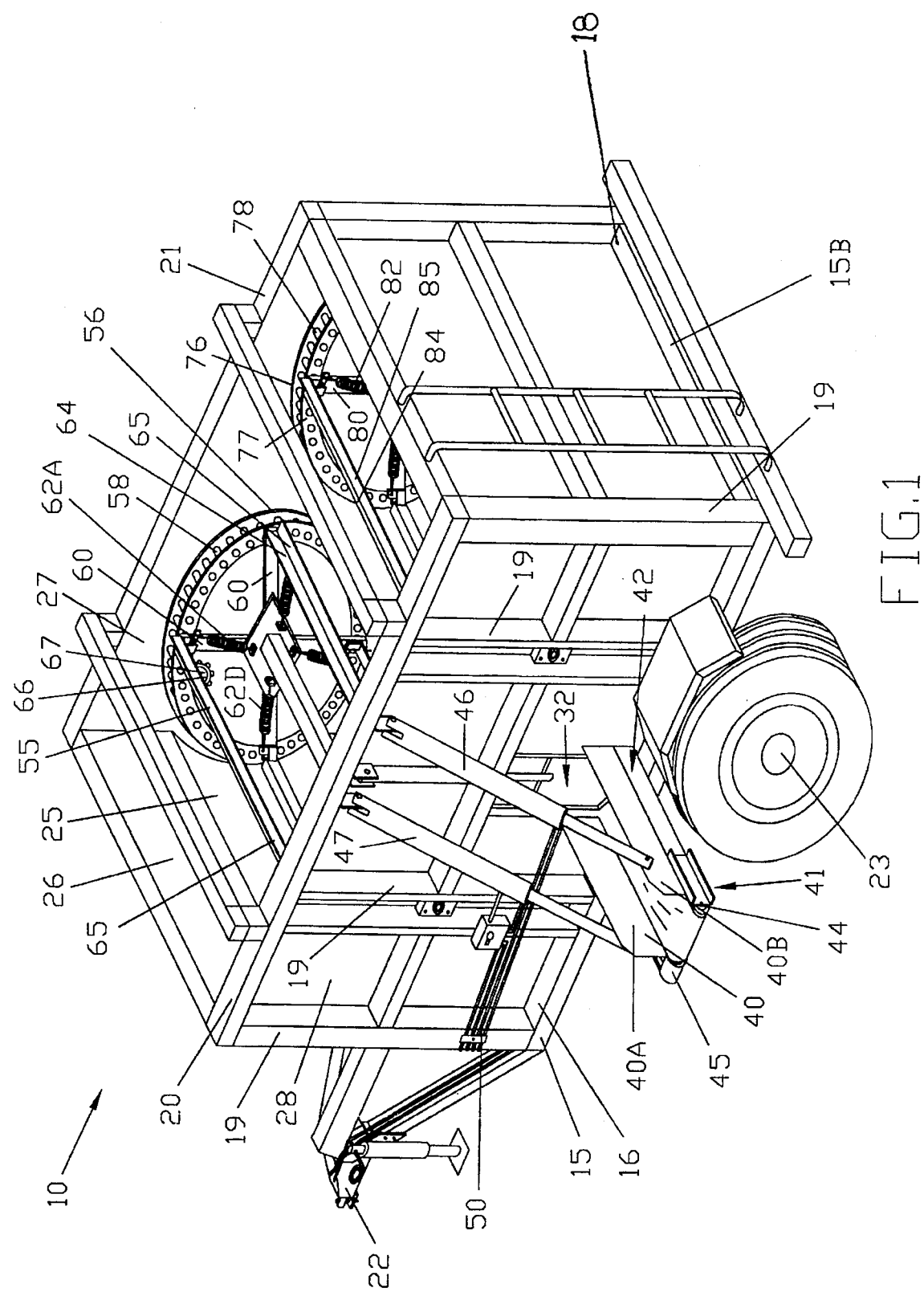
FIG. 1 is a top perspective view of the feed mixer apparatus showing the conveyor chute extending from the first side wall.
Figure 2:
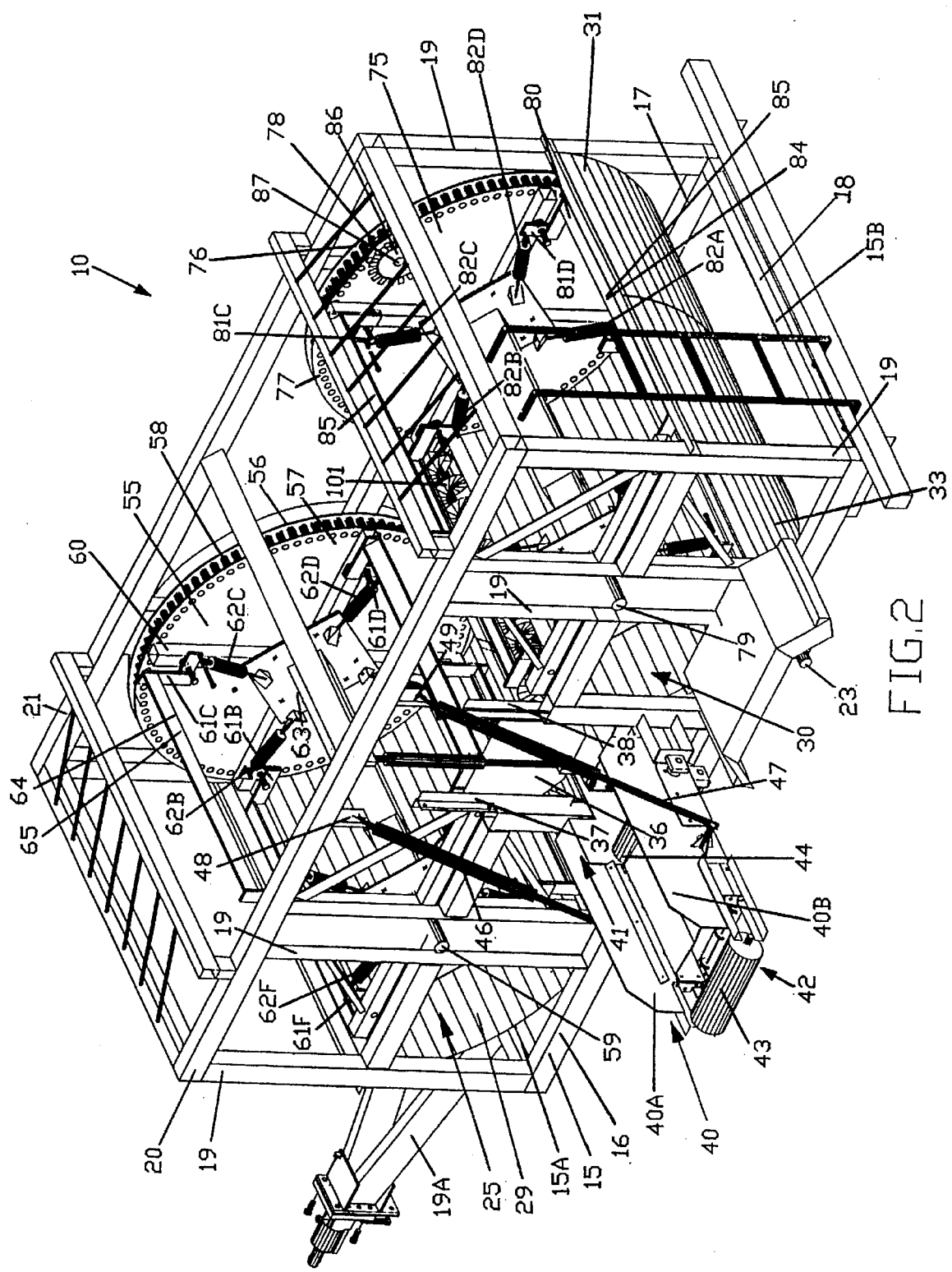
FIG. 2 is a top perspective view of the feed mixer apparatus with the front, back, and side walls removed showing, in particular, the frame and the reels and elongate mixing members.
Figure 3:
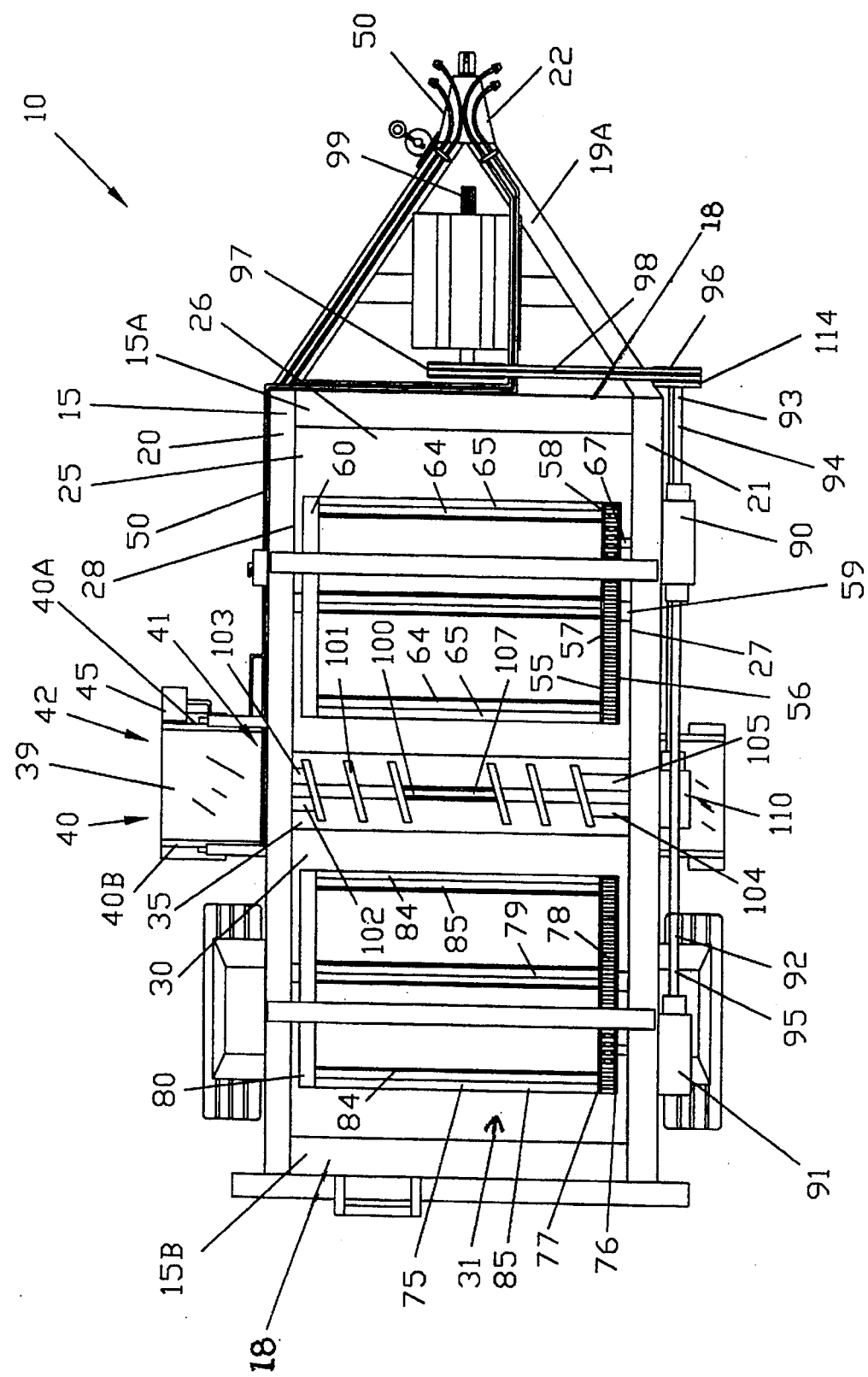
FIG. 3 is a top plan view of the feed mixer apparatus.
Figure 4:
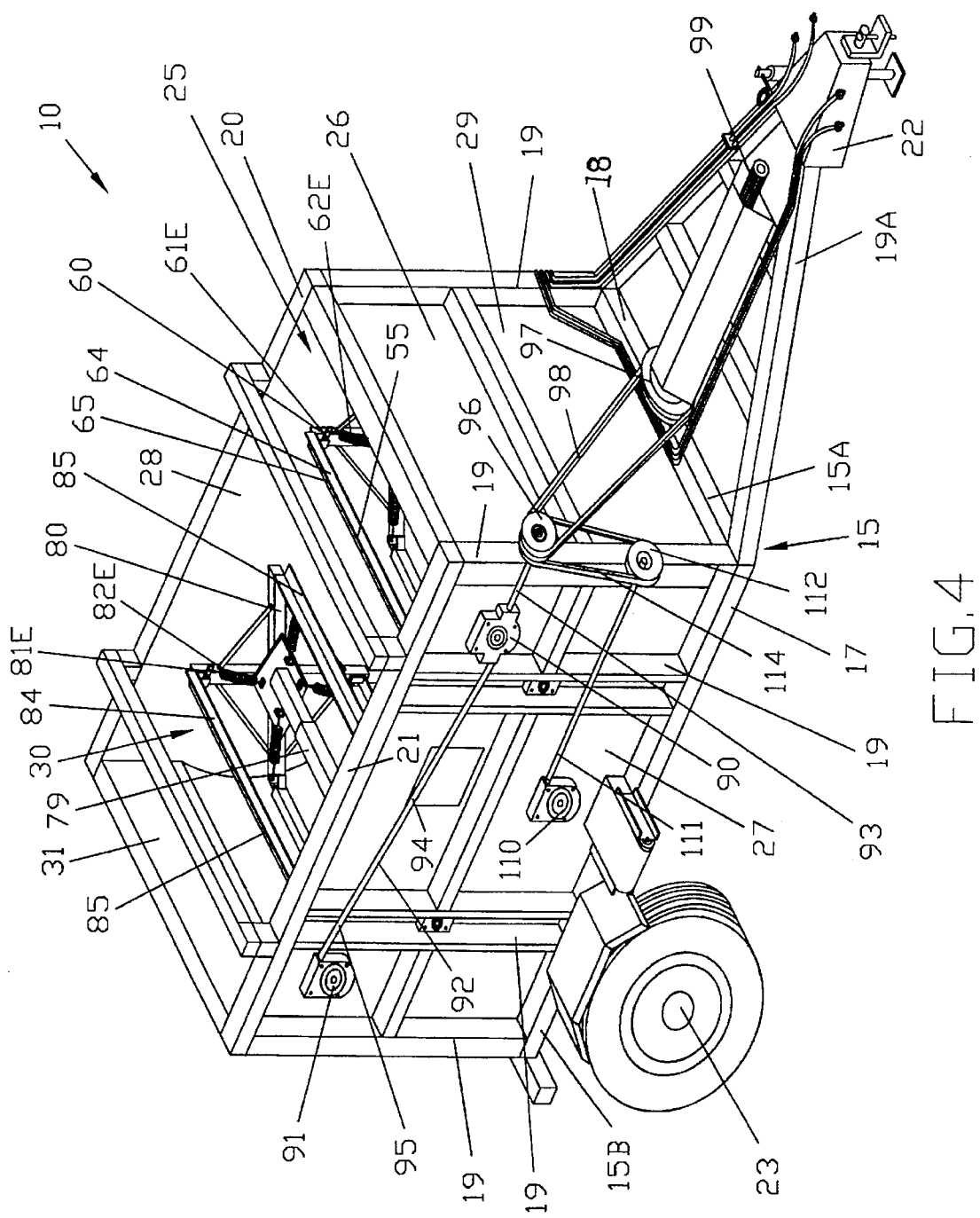
FIG. 4 is a front perspective view of the feed mixer apparatus.
Figure 5:
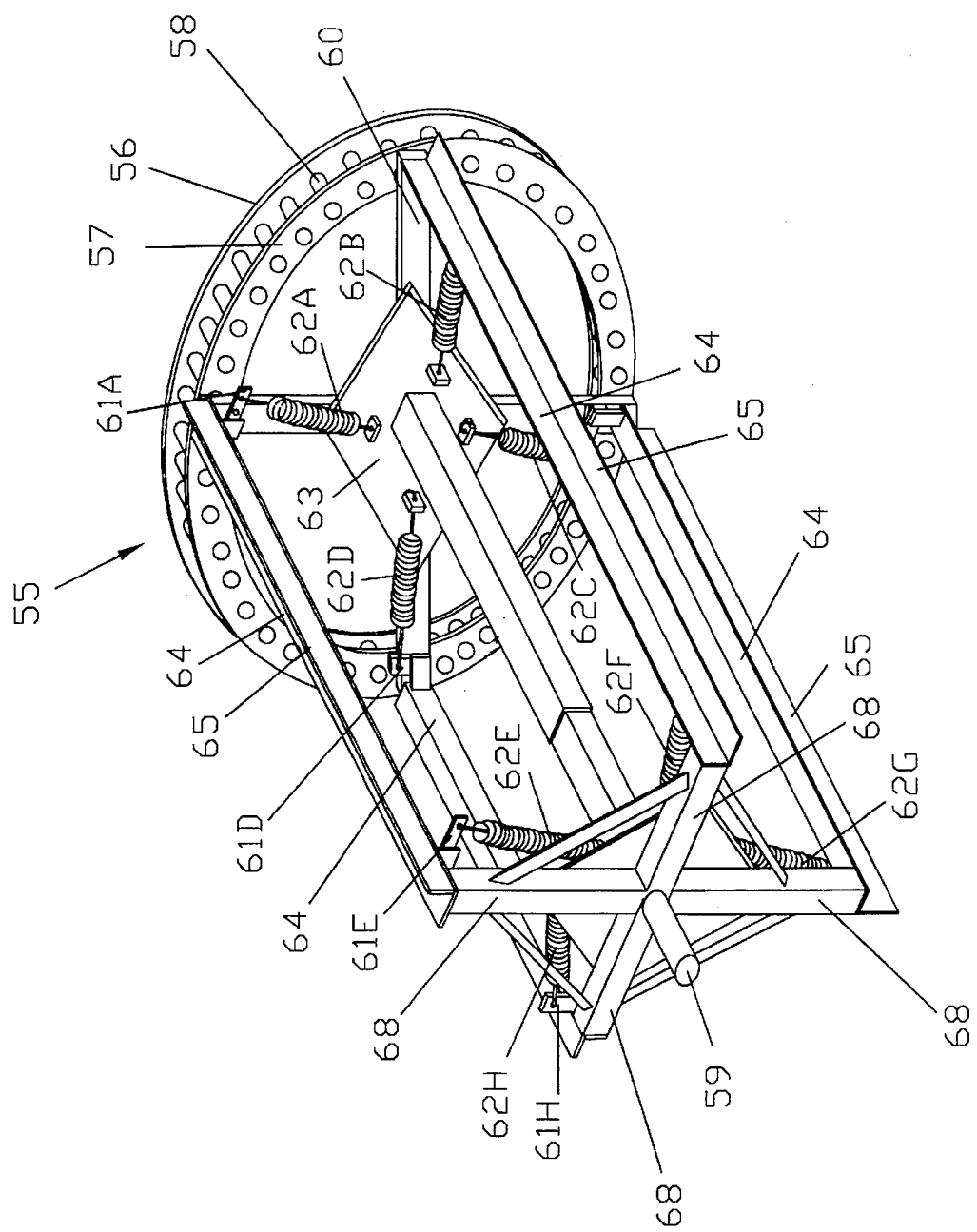
FIG. 5 is a detailed perspective view of the one of the mixing means including the real, elongate mixing members, and the radially-disposed arms.
Figure 6:
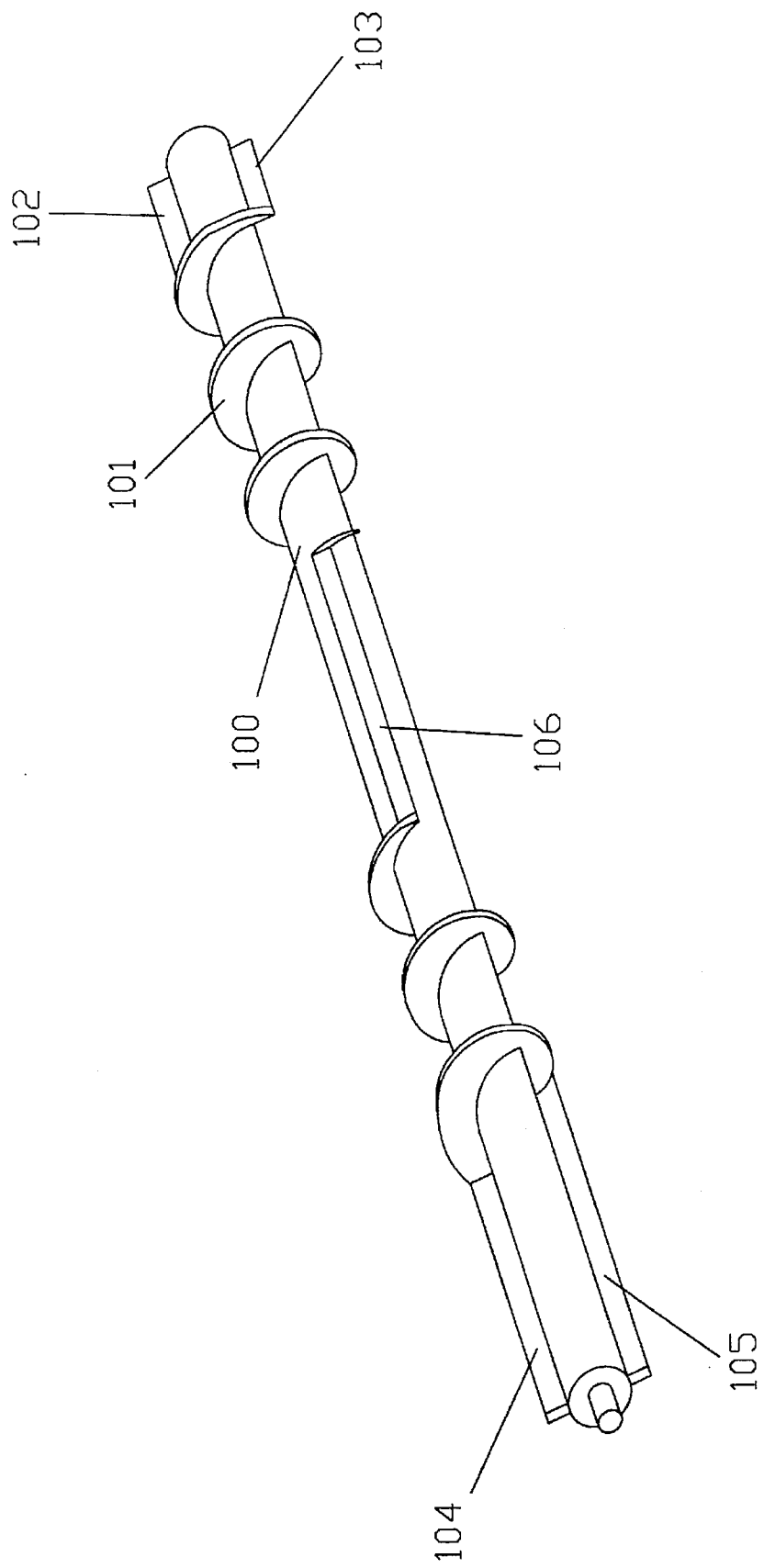
FIG. 6 is detailed perspective view of the auger in the feed mixer apparatus.

Referring to the drawings in FIGS. 1–6, in particular, the feed mixer apparatus 10 comprises a frame 15 having a pair of lower opposed, horizontally-disposed side members 16,17 interconnected by a plurality of lower, horizontally-disposed cross members 18 and further having a plurality of upright, elongate frame members 19 fixedly attached and spaced apart upon the lower side members 16,17 and the lower front end and lower back end cross members 18 and also having a pair of upper opposed, horizontally-disposed side members 20,21 fixedly attached on the top ends of the upright, elongate frame members 19 and interconnected by upper, horizontally-disposed cross members, the frame 15 being mounted upon a wheeled axle 23. A tongue 22 is fixedly attached to the lower front end cross member 18A at the front end 15A of the frame 15 and extends forwardly therefrom with a hitch at the front end of the tongue 22 for hitching to a prime mover.

The feed mixer apparatus 10 also comprises a forward mixing chamber 25 and a rearward mixing chamber 30 with the forward mixing chamber 25 being defined by a front wall 26 and a convex curved bottom wall 29 which is curved longitudinally of the frame 15 and with the rearward mixing chamber 30 being defined by a back wall 31 and a convex curved bottom wall 33 which is also curved longitudinally of the frame 15 and with both mixing chambers 25,30 further being defined by a first side wall 27 which is opposed to a second side wall 28 both of which interconnect the front wall 26 to the back wall 31. A trough 35 extends and is disposed between the first and second side walls 27,28 and separates the two curved bottom walls 29,33 essentially midway between the front wall 26 and the back wall 31. Feed is dispensed from the chambers 25,30 into the trough 35 and through an opening 32 in the second side wall 28 near the bottom thereof, the opening 32 being substantially in alignment with the trough 35. The opening 32 can be closed with a closure member 36 which is slidably mounted upon a pair of spaced rails 37,38 which are vertically and fixedly attached to the exterior of the second side wall 28 to either side of the opening 32.

To facilitate the dispensing of feed from inside the feed mixer 10, a conveyor chute 40 having a pair of opposed side members 40a–b, a first end 41, a second end 42, a pair of spaced apart conveyor rollers 43,44 journaled through the opposed side members 40a–b, and an endless belt 39 carried upon the conveyor rollers 43,44, is pivotally attached at its first end 41 to the second side wall 28 in alignment with the opening 32 and the trough 35 and extends outwardly generally perpendicular from the second side wall 28 with the second end 42 capable of being raised and lowered with the aid of a pair of hydraulic cylinders 46,47 each of which has one end fastened to a bracket 48,49 fixedly attached to an upper side member 20 of the frame 15 and has the other end fastened to a respective side member 40a–b near the second end 42 of the conveyor chute 40. One of the conveyor rollers 43 is disposed at the second end 42 of the conveyor chute 40 and is rotatably attached to a hydraulic motor 45 which drives the conveyor roller 43 which actuates the conveyor belt 39 upon which the feed is dispensed from the mixing chambers 25,30 and the trough 35. The hydraulic motor 45 and the hydraulic cylinders 46,47 are connected with hoses 50 to a hydraulic fluid source (not shown) carried upon the prime mover to which the feed mixer apparatus 10 is hitched.

A forward reel 55 and a rearward reel 75 are mounted parallel and adjacent to the first side wall 27 and are mounted upon respective forward and rearward reel shafts 59, 79 which extend between the first and second walls 27,28 and are journaled through both side walls 27,28 with the forward reel 55 being disposed in the forward mixing chamber 25 and the rearward reel 75 being disposed in the rearward mixing chamber 30. Each of the reels 55,75 has a first annular member 56,76 and a second annular member 57,77 spaced from the first annular member 56,76 and are interconnected by a plurality of spaced teeth-engaging members 58,78 which are fixedly attached to and between the respective annular members 56,57,76,77. A first sprocket 66 which is mounted upon a first worm gear shaft 67 and a second sprocket 86 which is mounted upon a second worm gear shaft 87 have teeth which engage the reels 55,75 between the spaced teeth-engaging members 58,78 and rotate the reels 55,75 upon the reel shafts 59,79. The worm gear shafts 67,87 are journaled through the first side wall 27 and are disposed such that the sprockets 66,86 are capable of engaging the teeth-engaging members 58,78 on the respective reels 55,75 and further extend inside respective gear boxes 90,91 which are mounted on the exterior of the first side wall 27. The forward gear box 90 which is mounted on the outside of the forward mixing chamber 25 has a third worm gear shaft 93 connected to a second pulley 96 disposed on the front end 15a of the frame 15 and a fourth worm gear shaft 94 connected to a second drive shaft 92 which extends between the forward 90 and rearward gear boxes 91 and is connected to a fifth worm gear shaft 95 which engages the second worm gear shaft 87 which extend inside the rearward gear box 91, the second drive shaft 92 being connected to the fourth 94 and fifth worm gear shafts 95 with knuckle joints. The second pulley 96 in cooperation with a first pulley 97 mounted upon an end of a first drive shaft 99 which is mounted upon the tongue 22, carries an endless belt 98. A protective sleeve is mounted about the first drive shaft 99 which has attachments at the other end thereof for connecting to a power takeoff primarily disposed on a prime mover such as a tractor. The power takeoff on the tractor when engaged actuates the first drive shaft 99 which actuates the pulleys 96,97 which rotate the worm gear shafts which drive the sprockets 66,86 that rotate the reels 55,75.

Each of the reels 55,75 has four radially-extending arms 60,80 which have outer ends that are fixedly attached to one of the annular members 57,77 of the respective reel 55,75 and which further have opposed ends which are fixedly attached to the respective reel shaft 59,79. In addition, another four radially-extending arms 68,88 have ends which are fixedly attached to near the other end of each of the reel shafts 59,79 inside the respective mixing chamber 25,30 parallel and adjacent to the second side wall 27. Each of the chambers 25,30 has four elongate mixing members 64,84 extending between the first 27 and second side walls 28 and having ends which are fixedly attached to linkages 61a–h, 81a–h which are pivotally attached with bolts to the outer ends of the radially-extending arms 60,68,80,88. Each of the linkages 61a–h,81a–h is connected to a separate compression spring 62a–h,82a–h which is also connected to a planar support member 63,83 which is mounted upon the respective reel shaft 59,79 which extends through a central portion of the planar support member 63,83. The elongate mixing members 64,84 are resiliently deflectable as they move with the respective reel 55,75 so that if they should encounter bunched up material which could break the elongate mixing members 64,84, the elongate mixing members 64,84 will deflect around the bunched up material and spring back into their original positions. Each of the elongate mixing members 64,84 is essentially an angle iron with a wiper member 65,85 fastened to the longitudinal edge of the angle iron. The elongate mixing members 64 in one mixing chamber 55 move in a direction opposite to the elongate mixing members 84 in the other mixing chamber 75 such that as one elongate mixing member is coming up in its rotation about the respective reel shaft on the side adjacent to the other mixing chamber, one of the elongate mixing members in the other mixing chamber is coming down on the side adjacent to the aforesaid mixing chamber so that the feed material is tumbled from one chamber to the other.

To further facilitate the mixing of the feed from one chamber to the next, an auger 100 is rotatably disposed upon the trough 35 and is journaled through the first side wall 27 and has its own gear box 110 which is connected to a third drive shaft 111 which has an end attached to a third pulley 112 which in cooperation with the second pulley 96 carries an endless belt 114. In addition to facilitating the mixing of the feed, the auger 100 also moves the feed material along the trough 35 to the opening 32 in the second side wall 28 and to the conveyor chute 40. Only finely mixed feed material is allowed to exit the chambers 25,30 through the opening 32 in the second side wall 28.

Three pairs of planar fins 102–107 extend longitudinally along a portion of the length of the shaft of the auger 100 and are separated by sections of auger flighting 101. The fins 102–107 in each pair are spaced from one another about the auger shaft with the spacing preferably being approximately 180 degrees. The fins 102–107 extend perpendicularly outward from the auger shaft and prevent clumps or chunks of feed material from exiting the chambers 25,30 through the opening 32 and each fin 102–107 has a height from the auger shaft less than that of the height of the flighting 101. One pair of fins 102,103 is at one end of the auger shaft, another pair 104,105 at the other end of the auger shaft, and a third pair 106,107 in the middle portion of the auger shaft. The fins 106,107 in the middle portion of the auger shaft are spaced approximately 90 degrees about the auger shaft relative to the fins 102–105 at the ends of the auger shaft. As the feed material is tumbled about the mixing chambers 25,30 by the elongate mixing members 64,84 and moved across the trough 35 and auger 100 from one mixing chamber 25,30 to the next, only fine particles of feed material is allowed to exit through the opening 32 in the second wall 28. Clumps or chunks of feed material is flipped out of the trough 35 by the fins 102–107 on the auger shaft. As with the reels 55,75, the auger 100 is actuated by the power take off on the prime mover.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A feed mixer apparatus comprising:
    a frame having a front end and having a front wall, a back wall, and a first and second side walls with said second side wall having an opening therethrough which feed material is dispensed from said feed mixer apparatus, said opening being closeable by closure member;
    a forward mixing chamber having a convexed curved bottom wall which is curved longitudinally of said frame;
    a rearward mixing chamber having a convexed curved bottom wall which is curved longitudinally of said frame;
    a trough extending between said side walls and separating said bottom walls of said mixing chambers;
    a means for mixing said feed material in said mixing chambers, comprising a forward reel shaft journaled to said side walls in said forward mixing chamber, a forward reel mounted upon said forward reel shaft, a rearward reel shaft journaled in said side walls in said rearward mixing chamber, and a rearward reel mounted upon said rearward reel shaft, said reels mounted adjacent and parallel to said first wall with each reel having a plurality of teeth-engaging members spaced apart from one another; and
    a means for dispensing said feed material from said feed mixer apparatus comprising a conveyor chute having a first end pivotally attached to said second wall in alignment with said opening and having a height adjustable second end.

2. A feed mixer apparatus as described in claim 1, wherein said means for mixing said feed material also comprises a pair of sprockets each of which is mounted upon a respective one of a pair of sprocket shafts which are journaled through said first wall, and each of which actuates a respective one of said reels.

3. A feed mixer apparatus as described in claim 2, wherein said sprockets are positioned such that the teeth of said sprockets are engageable to said teeth-engaging members of said reels.

4. A feed mixer apparatus as described in claim 3, wherein said means for mixing said feed material further comprises a first drive shaft connectable to an actuator for actuating said mixing means, a first pulley mounted upon said first drive shaft, a pair of gear boxes each of which is connected to one of said respective sprocket shafts, a second drive shaft extending between said gear boxes, a second pulley mounted upon a shaft connected to one of said gear boxes and in cooperation with said first pulley carrying an endless belt.

5. A feed mixer apparatus as described in claim 3, wherein said means for mixing said feed material also includes a plurality of radially-extending arms fixedly attached to said reel shafts, some of said radially-extending arms being adjacent and parallel to said first wall and being attached to said reels and the rest of said radially-extending arms being adjacent and parallel to said second wall and being spaced from said some of said radially-extending arms.

6. A feed mixer apparatus as described in claim 5, wherein said means for mixing said feed material further includes a plurality of spring-loaded linkages each of which is pivotally attached to the outer end of a respective one of said radially-extending arms.

7. A feed mixer apparatus as described in claim 6, wherein said means for mixing said feed material also includes a plurality of elongate, resiliently deflectable mixing members extending between said side walls and having ends which are attached to said spring-loaded linkages, said elongate, resiliently deflectable mixing members capable of deflecting about relatively immovable clumps of said feed material to avoid being broken.

8. A feed mixer apparatus as described in claim 7, wherein said mixing means for mixing said feed material further includes an auger rotatably mounted in said trough, said auger including an auger shaft, flighting attached to said auger shaft, and a plurality of pairs of fins fixedly attached to said auger shaft to facilitate the mixing of said feed material.

9. A feed mixer apparatus as described in claim 8, wherein said pairs of fins extend lengthwise upon said auger shaft and extend generally perpendicular from said auger shaft.

10. A feed mixer apparatus as described in claim 9, wherein said pairs of fins are separated by the flighting of said auger.

11. A feed mixer apparatus as described in claim 10, wherein each of said pair of fins are spaced approximately 180 degrees from each other about said auger shaft.

12. A feed mixer apparatus as described in claim 11, wherein each of said fins has a height from said auger shaft less than that of said flighting such that finely mixed particles of said feed material are moved by said auger to said conveyor chute and that clumps or chunks of said feed material is moved back into said mixing chambers.

13. A feed mixer apparatus as described in claim 8, wherein said means for dispensing said feed material from said feed mixer apparatus includes said auger which urges finely mixed particles of said feed material to said conveyor chute through said opening.

14. A feed mixer apparatus as described in claim 12, wherein said second end of said conveyor chute is raised and lowered by hydraulic means.

15. A feed mixer apparatus as described in claim 14, wherein said hydraulic means includes a pair of hydraulic cylinders each of which has one end fastened to said frame and the other end fastened to said second end of said conveyor chute.

* * * * *